United States Patent [19]

Matyas et al.

[11] Patent Number: 4,757,534
[45] Date of Patent: Jul. 12, 1988

[54] CODE PROTECTION USING CRYPTOGRAPHY

[75] Inventors: Stephen M. Matyas, Kingston; Jonathan Oseas, Hurley, both of N.Y.

[73] Assignee: International Business Machines Corporation, Armonk, N.Y.

[21] Appl. No.: 11,419

[22] Filed: Feb. 3, 1987

Related U.S. Application Data

[63] Continuation of Ser. No. 682,854, Dec. 18, 1984.

[51] Int. Cl.⁴ ............................................. H04L 9/00
[52] U.S. Cl. ........................................ 380/25; 380/23
[58] Field of Search .................... 380/23, 25; 235/380, 235/382

[56] References Cited

U.S. PATENT DOCUMENTS

| | | | |
|---|---|---|---|
| 4,433,207 | 2/1984 | Best | 178/22.09 |
| 4,453,074 | 6/1984 | Weinstein | 235/380 |
| 4,465,901 | 8/1984 | Best | 178/22.08 |
| 4,536,647 | 8/1985 | Atalla et al. | 235/379 |
| 4,575,621 | 3/1986 | Dreifus | 235/380 |

OTHER PUBLICATIONS

"Preventing Unauthorized Access to Diskette-Loaded Microcode", by Gurugé, IBM Tech. Disclosure, vol. 21, #2, 7/78.

Primary Examiner—Salvatore Cangialosi
Assistant Examiner—Aaron J. Lewis
Attorney, Agent, or Firm—John E. Hoel; Joseph C. Redmond, Jr.; Clark, George E.

[57] ABSTRACT

A cryptographic method for discouraging the copying and sharing of purchased software programs allows an encrypted program to be run on only a designated computer or, alternatively, to be run on any computer but only by the user possessing a designated smart card. Each program offering sold by the software vendor is encrypted with a unique file key and then written on a diskette. A user who purchases a diskette having written thereon an encrypted program must first obtain a secret password from the software vendor. This password will allow the encrypted program to be recovered at a prescribed, designated computer having a properly implemented and initialized encryption feature. The encryption feature decrypts the file key of the program from the password, and when the encrypted program is loaded at the proper computer, the program or a portion of it is automatically decrypted and written into a protected memory from which it can only be executed and not accessed for non-execution purposes. In alternative embodiments, the user is not confined to a prescribed, designated computer buy may use the program on other, different computers with a smart card provided the computers have a properly implemented and initialized encryption feature that accepts the smart card. As a further modification, the cryptographic facility may support operations that enable the user to encrypt and decrypt user generated files and/or user generated programs.

10 Claims, 12 Drawing Sheets

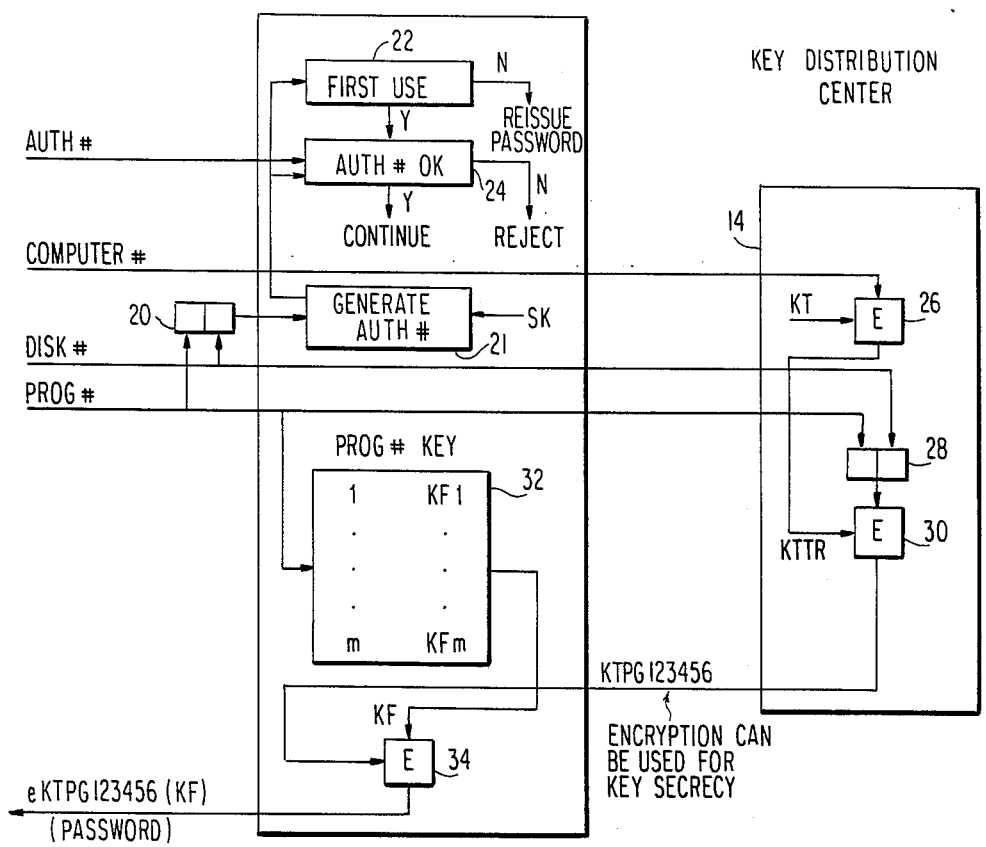
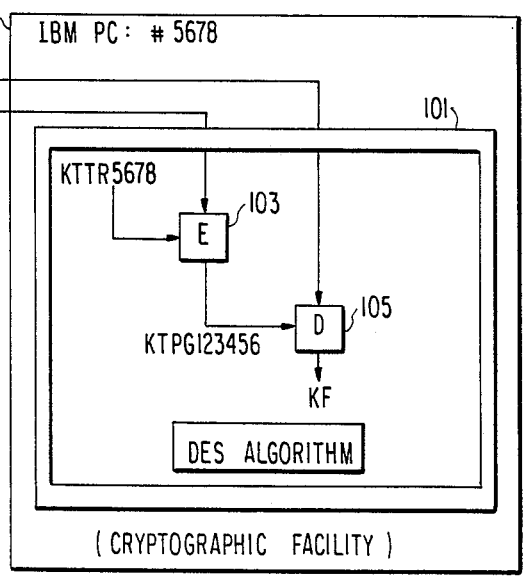
FIG. 3
FIG. 4

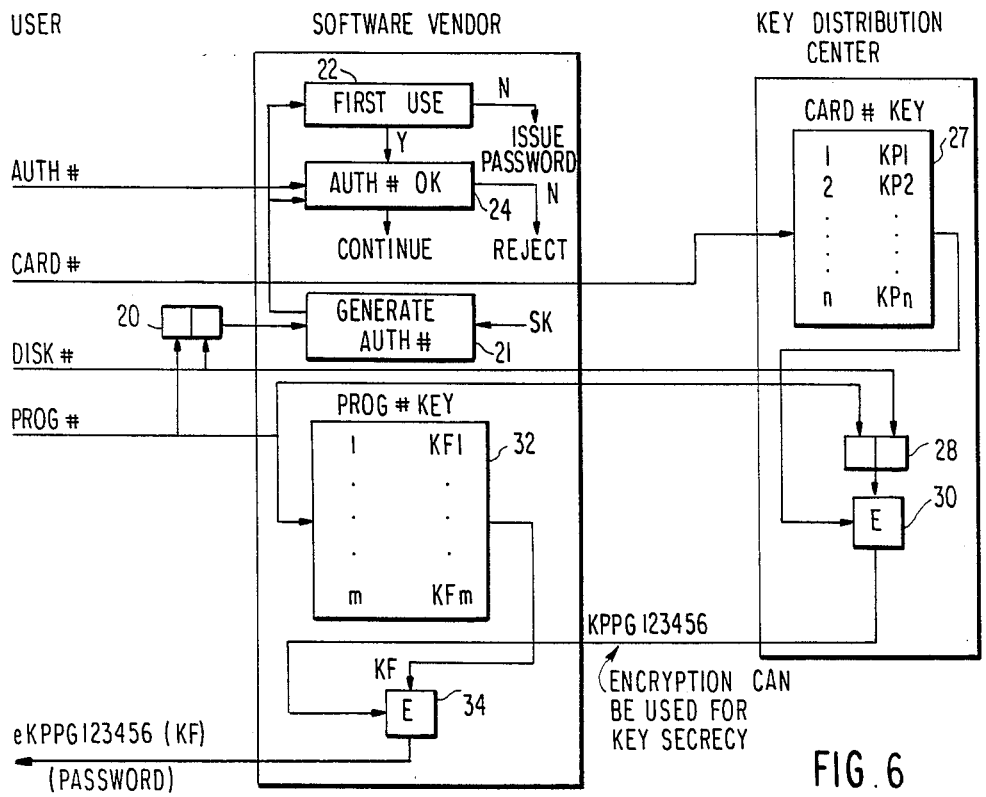

CODE PROTECTION USING CRYPTOGRAPHY

BACKGROUND OF THE INVENTION

This invention is directed to a cryptographic method for discouraging the copying and sharing of purchased software programs by allowing an encrypted program to be run on only a designated computer or, alternatively, to be run on any computer but only by the user possessing a designated smart card.

With the proliferation of so-called micro computers or personal computers, there has been an explosion in the writing and publishing of software for these computers. The investment in time and capital in the development of a good software program can be substantial, and in order to recoup this investment, the authors, copyright owners and/or publishers must rely on royalties and the amortization of costs produced by the sale of the programs. Since programs are generally distributed on inexpensive floppy diskettes, the end user often does not appreciate the substantial costs in the production of the programs. Moreover, the disk operating systems of most micro computers feature a disk copy utility which enables the end user to easily make back up copies of program diskettes. The result has been a misuse of the utility to make unauthorized copies. For example, two or more potential end users desiring a program may pool their resources and buy one copy of the program and then duplicate both the program diskette and the copyrighted manual that accompanies the program diskette. As another example, a small business having several micro computers may buy a single copy of a program and then duplicate the program diskette and manual in order to distribute copies to each micro computer station in the company. Both of these examples are clear violations of the copyright laws, but searching out and prosecuting violators is often impossible. The net result is a substantial loss of revenues to software authors and publishers. These revenues are needed in order to finance the development of new and improved software programs as well as to provide a reasonable profit to those who produced the programs that are copied without authorization.

The problem of unauthorized copying and use of programs has been addressed by the prior art. U.S. Pat. No. 4,120,030 to Johnstone discloses a computer software security system wherein the data address portions of a set of computer instructions are scrambled in accordance with a predetermined cipher key before the instructions are loaded into an instruction memory. The data involved in the program is loaded into a separate data memory at the addresses specified in the original, unscrambled program. An unscrambler circuit, which operates in accordance with the cipher key, is coupled in series with the data memory address input conductors.

U.S. Pat. No. 4,168,396 to Best discloses a microprocessor for executing computer programs which have been enciphered during manufacture to deter the execution of the programs in unauthorized computers. U.S. Pat. No. 4,278,837 to Best discloses a crypto-microprocessor chip that uses a unique cipher key or tables for deciphering a program so that a program that can be executed in one chip cannot be run in any other microprocessor. U.S. Pat. No. 4,433,207 to Best discloses an integrated circuit decoder for providing micro computer users with access to several proprietary programs that have been distributed to users in cipher. The decoder chip can decipher a program if an enciphered key called a "permit code" is presented to the decoder chip.

U.S. Pat. No. 4,446,519 to Thomas discloses a method for providing security for computer software by providing each purchaser of a software package with an electronic security device which must be operatively connected to the purchaser's computer. The software sends coded interrogation signals to the electronic security device which processes the interrogation signals and transmits coded response signals to the software. The programs will not be executed unless the software recognizes the response signals according to preselected security criteria.

The various schemes disclosed by these patents require specialized and dedicated hardware for accomplishing the security feature. Generally, these schemes are cumbersome and expensive to implement and therefore not commercially acceptable. What is needed is a software protection scheme which is simple and inexpensive to implement avoiding the need for specialized and dedicated hardware and which is attractive to a large number of diverse software publishing houses.

SUMMARY OF THE INVENTION

It is therefore an object of the present invention to provide a software protection scheme which is inexpensive to implement and essentially transparent to the end user so that it does not detract from the commercial appeal of the software program.

It is a further object of the invention to provide a software protection scheme which will allow copying of program diskettes to a hard disk or for purposes of making backup copies yet limit the simultaneous beneficial use of multiple copies to one or more designated computers or, alternatively, limit the use to one unique, non-reproducible and portable device.

It is another and more specific object of the invention to provide a cryptographic method for discouraging the copying and sharing of purchased software programs by allowing an encrypted program to be run only on a designated computer or, alternatively, to be run on any computer but only by the user possessing a designated smart card.

According to the invention, each program offering sold by a software vendor is encrypted with a unique file key and then written on the diskette. A user who purchases a diskette containing an encrypted program must first obtain a authorization number and password from the software vendor. This password will allow the encrypted program to be recovered at a prescribed, designated computer having a properly implemented and initialized encryption feature which may be stored in Read Only Memory (ROM), for example. As part of an initialization process, when the program is first loaded, it polls the user to input the password. The password is written by the program in the header record of the file, and once written in the header record, the program will not prompt the user to input his or her password on subsequent uses of the program. When the diskette is loaded at the proper computer, the encrypted program or a controlling portion of it is automatically decrypted and written into a protected memory from which it can only be executed and not accessed for non-execution purposes. In an alternative embodiment, the user is not confined to a prescribed, designated computer but may use the program on other, different computers with a smart card. A smart card as defined here is one having a crypto capability, typically implemented by incorporating a micro-circuit on the card. The smart card is issued to the user when the user purchases a computer. The smart card is preinitialized by the computer manufacturer with a secret parameter unique to that card. The procedure is similar except that in this case, the password used in conjunction with the smart card allows the user to decrypt and execute the program on any computer having a properly implemented and initialized encryption feature. The smart card embodiment can be further modified to allow portability with a combination of both a Public Key (PK) algorithm and the Data Encryption Standard (DES) algorithm. In this case, the designated public registry (key distribution center) additionally personalizes the card with the public key of the computer manufacturer as well as a unique secret card key (the DES key). When a customer buys software, s/he automatically gets a personalized intelligent secure card (smart card). Each different program recorded on the diskette is encrypted under a different file key designated by the supplier of the software. The customer then obtains an authorization number and password from the software vendor, as before. The password is written in the header of the file on the diskette. The computer is also personalized with a unique key pair, a public computer key and a secret computer key. However, the public computer key is first decrypted under the secret key of the computer manufacturer and stored in the computer in that form. When the program diskette is used, there is a handshake protocol between the smart card and the computer which, in effect, recovers the file key and enciphers it under the public key of the computer. This protocol is such that the handshake will work only at a suitable computer with a public key algorithm and a properly installed key pair; i.e., a secret computer key and a public computer key decrypted under the secret key of the designated public registry. The advantage to this approach is that the file key can be encrypted using a public key, and it is not necessary for a universal secret DES key to be stored on each smart card. The protocol for password generation and distribution is unaffected by the modification to the internal protocol; i.e., it is the same for the DES only smart card as for the DES/PK smart card.

BRIEF DESCRIPTION OF THE DRAWINGS

The foregoing and other objects, aspects and advantages of the invention will be better understood from the following detailed description of the invention with reference to the drawings, in which:

FIG. 3 is a flow diagram illustrating the password generation key management according to the invention without a smart card;

FIG. 4 is a flow diagram illustrating the operation of the computer cryptographic facility key management according to the invention without a smart card;

FIG. 6 is a flow diagram illustrating the password generation key management according to the invention with the smart card;

FIG. 7 is an illustration of a program diskette format using a smart card;

DETAILED DESCRIPTION OF THE INVENTION

In the description which follows, the notations "e" and "d" are used to denote encrypted and decrypted, respectively. For example, "ePKt(KF)" means the key KF is encrypted under the key PKt. Similarly, "dSKu(PKt)" means the key PKt is decrypted under the key SKu. Also, the term "personal computer" is intended to cover so-called "smart terminals" which may include personal computers connected to a main frame computer in a network.

Figure 1:
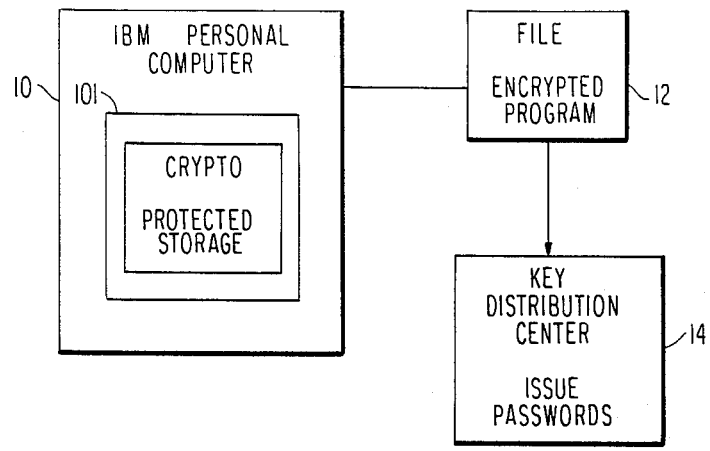
FIG. 1 is a block diagram of an overview of the system according to a first embodiment of the invention.
Figure 2:
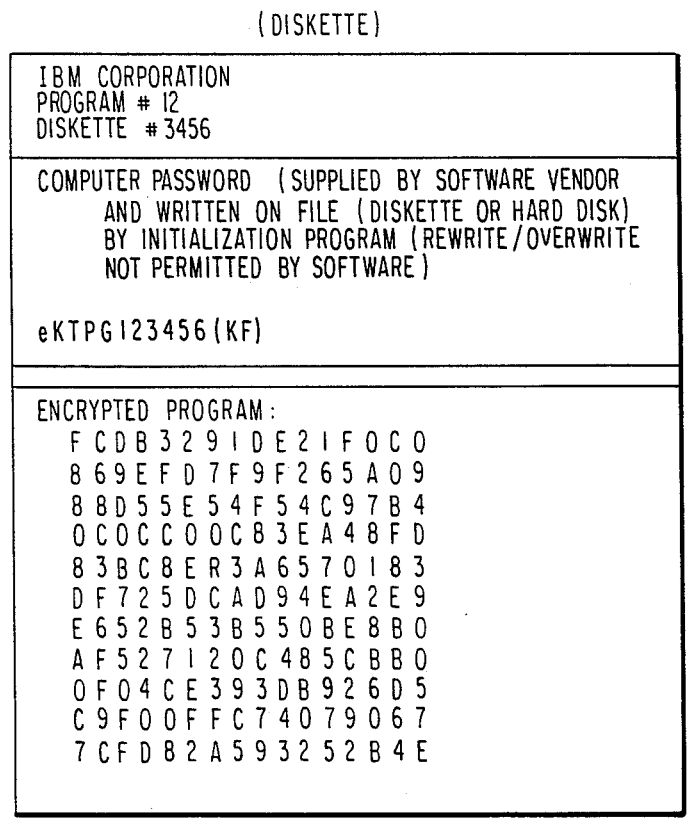
FIG. 2 is an illustration of a program diskette format that does not use a smart card.

Referring now to the drawings and more particularly to FIG. 1, there is shown an overview of the first embodiment of the invention. The system according to this embodiment comprises a personal computer 10 having a crypto protected storage facility 101. Each program offering 12 sold by the software vendor is encrypted with a unique file key, KF, and then written on the diskette. The format of the diskette is generally shown in FIG. 2. One type of cryptographic method that may be used is a cipher block chaining technique which requires an initializing vector. If desired, different initializing vectors using the same file key, KF, can be used to encrypt the same program written on different diskettes. This ensures that different cipher text is produced for each diskette and prevents differences in the plaintext from being observed by comparing the ciphertext. The initializing vector is written in the header record on the diskette.

A user, who purchases a diskette containing an encrypted program, must first obtain a authorization number and password from the software vendor. This password will allow the encrypted program to be recovered at the prescribed, designated personal computer 10 having a properly implemented and initialized encryption feature. The authorization number and password allows the particular program to be decrypted, and thus executed, only on a particular personal computer. This authorization number and password is unique to the particular program and computer where it is to be recovered and executed. The password will not allow other encrypted programs to be recovered on that computer, nor will it allow that same encrypted program to be recovered on a different computer. Optionally, the user could be given a second password that would allow the encrypted program to be recovered on a designated backup computer. Except for the backup computer, the user would ordinarily be expected to pay an extra fee for each additional password that would allow the encrypted program to be recovered on a different computer.

Each diskette has a unique serial number written on the diskette envelope or outer cover (not shown) and visible to the user. As shown in FIG. 2, this serial number is also recorded in the header record of the diskette. Also recorded in the header of the diskette is the program number. In the specific example shown in the figure, the program number is "12" and the serial number or diskette number is "3456". A multi-digit authorization number is obtained by encrypting the program number and diskette serial number, concatenated together, under a secret cryptographic key available to and known only by the software vendor. An n-bit portion of the authorization number is also written on the diskette envelope except that it is covered by a thin metallic film much like that used by the instant lotteries to hide numbers on lottery cards. Where n is equal to 16, for example, there are 65,536 possible numbers for the portion of the authorization number written on the diskette envelope and therefore, one would have only a chance of one in 65,536 of accidently guessing a correct number written on the diskette envelope.

When a password is requested, an authorization number of reference is generated in the same manner as that for generating the authorization number. For each password initially issued, a record is made in a data base that this is a first use of the authroization number of reference in the process of issuing the password to a requesting user, and a record is also made of the password which is issued. Therefore, for each request of a password, a first use check is made to determine whether the authorization number of reference has been previously used for generating the password.

The procedure is illustrated in FIG. 3. After purchasing a diskette, the user places a telephone call to the software vendor using, for example, a designated 800-number. It is assumed that the user will not accept a diskette whose authorization number has been exposed, i.e. where the metallic film has been scratched off. S/he provides the software vendor with the program number, the n-bit portion of the authorization number, the diskette serial number, and the computer number. Each computer 10 has a unique identification or number that is provided on the cover, for example, by a press-on label visible to the user. This identification or number is associated with the secret key of the crypto facility of the computer. The program number and the diskette serial number are loaded into register 20. Recall that for the specific example shown in FIG. 2, these numbers are "12" and "3456", respectively. Then in block 21, the software vendor simply encrypts the provided program number and diskette serial number, concatenated together, with a special secret key, SK, used only to generate multi-digit authorization numbers. The n-bit portion of the authorization numbers written on the diskettes are produced with the same encryption technique. The multi-digit authorization number or reference is first checked in the software vendor's database to determine if the authorization number has been used before. Alternatively, the software vendor could perform this check using the program number and diskette serial number. In this case, the software vendor simply records the program number and diskette serial number in his data base whenever a password has been issued for those numbers. If the authorization number or the program number and diskette serial number have been used before, the software vendor knows that a password has been issued for that program number and diskette serial number and that this password has been recorded in his data base. In that case, the password is retrieved and reissued to the caller. This process is represented by block 22 in FIG. 3. On the other hand, if the result of this process indicates a first use, then in block 24 the designated n-bit portion of the authorization number of reference produced in block 21 is compared with the n-bit portion of the authorization number provided by the caller. If a match is obtained, the software vendor generates a special password that will allow the encrypted program to be decrypted and executed at the designated computer. To accomplish this, the software vendor forwards an electronic message to the key distribution center 14, passing the program number, diskette serial number and computer number. The key distribution center 14 encrypts the computer number with a key, KT, in encryption block 26 to produce an encryption key, KTTR, unique to that particular computer. Alternatively, the key KTTR could be obtained from a table of stored keys. The program number and the diskette serial number in register 28 are then encrypted in encryption block 30 with the key KTTR to produce a cryptographic key unique to the program and computer. In the example illustrated, this cryptographic key is KTPG123456. The key distribution center 14 then returns the cryptographic key to the software vendor. To further enhance the security of the system, encryption can be used between the software vendor and the key distribution center to protect the secrecy of the cryptographic key.

Meanwhile, the software vendor has obtained from its database the file key, KF, corresponding to the program number provided by the caller as indicated by table 32. This key KF is then encrypted in encryption block 34 with the cryptographic key returned by the key distribution center 14 to generate the requested password. The generated password is then given to the caller. Passwords may be, for example, 64-bits long and therefore cannot be guessed or derived from other information available to the caller. The only way to get a password is from the software vendor. As a last step, the software vendor now makes a record in his data base that this is the first use of the authorization number of reference in the process of issuing the password to a requesting user, and he also records the calculated password in his data base.

As part of the initialization process, when the program is loaded in the computer 10, it polls the user to input the password. The password is written by the program in the header record of the file as shown in FIG. 2, and once written, the program will not prompt the user to input his or her password on subsequent uses of that program. For example, a protocol could operate such that the computer always reads the header of the diskette looking for a recorded password. If no password is found, it prompts the user to enter the password and then writes the password in the header. If a password is found in the header, the computer uses this password in lieu of prompting the user to enter a password. The user could also be provided with an override to enter the password in case the password recorded in the header fails to produce the correct file key, KF; i.e., the encrypted file is not recovered properly with the recovered key KF. Note that from the software vendor's viewpoint the password need not be kept secret since it does not unlock other encrypted programs.

Optionally, the procedure for issuing passwords at the software vendor could be fully automated by using a voice answer back system in conjunction with a multi-frequency tone input. For example, the caller would be prompted to enter the appropriate numbers using the multi-frequency tone keyboard on a telephone, and these numbers would be repeated to the user for verification. If a proper authorization number is given, an electronic message is sent to the key distribution center 14 to obtain the necessary cryptographic key. This message is used to calculate the password which, in turn, is repeated to the caller using the automated voice system. The process of obtaining the password from the software vendor could be automated still further by initiating a communications session between an initialization program in the personal computer 10 and a password distribution program located in the computer system of the software vendor. In this case, the user would call the 800-number and initiate the session. The program number and diskette serial number could be read from the header record of the diskette where they have been written by the software vendor. The computer number could be stored within the system and provided automatically also. The user would be prompted at the appropriate point in the session to enter the authorization number through the keyboard. The obtained password would be written automatically to the header record of the diskette file.

If necessary, the user can contact the software vendor at any later time to re-receive his or her password. To do this, he supplies only the program number and diskette serial number, which is enough information to allow the software vendor to determine that a password has already been issued for that pair of numbers and to recover the password value which has been recorded previously in his data base. In essence, the caller is given an already calculated password for any program number and diskette serial number in the vendor's database. This option does not weaken the system but merely makes it more usable by end users.

When the diskette is loaded at the proper computer 10, the encrypted program or a portion of it is automatically decrypted and written into a protected memory 101 from which it can only be executed and not accessed for non-execution purposes. This is shown in FIG. 4 where the cryptographic facility 101 of computer 10 reads password, program number and diskette serial number from the file header. The program number and diskette serial number concatenated together are encrypted in encryption block 103 with the encryption key for that particular computer to produce a decryption key which is used in decryption block 105 to decrypt the password and produce the secret file key, KF, that is used in decrypting the program or a portion of the program. The procedure used is the Data Encryption Standard (DES). Note that only the designated computer is capable of generating the decryption key that will produce the file key, KF.

Figure 5:
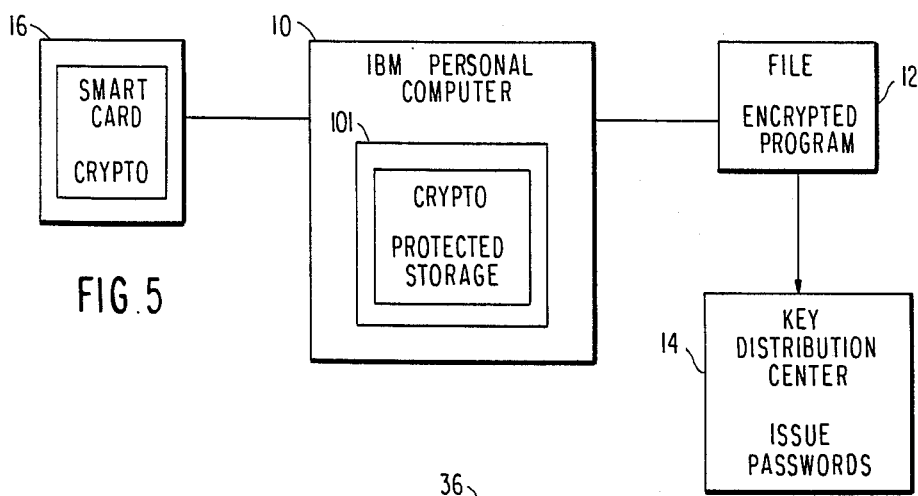
FIG. 5 is a block diagram of an overview of the system according to the invention using a smart card.

Turning now to FIG. 5, there is shown an alternative embodiment which is an extension of the first to allow portability of an encrypted program by means of a smart card 16. In this embodiment, when the user purchases a computer, s/he is also issued a smart card 16 that is preinitialized by the computer manufacturer with a secret parameter unique to that card. A user, who purchases a diskette containing an encrypted program, also obtains a secret password from the software vendor as before, except here, the password is used in conjunction with the smart card to allow the user to decrypt and execute the program on any personal computer having a properly implemented and initialized encryption feature The process is illustrated in FIG. 6. To obtain the secret password, in this case, the user provides the smart card number rather than the computer number. Each smart card has a unique identification or card number that can be read by the user. If the authorization number is valid and another request has not been made for that program number and diskette serial number as indicated by the compare blocks 22 and 24, the software vendor generates a special password that will allow the encrypted program to be decrypted at any personal computer with a valid encryption feature when used with that smart card. Again, the software vendor obtains a unique cryptographic key from the key distribution center 14 which is used in conjunction with the secret file key to generate the requested password. In this case, the key distribution center 14 is owned, controlled or established under the direction of the computer manufacturer and uses the card number to obtain a corresponding card encryption key, KP, from table 27. Alternatively, the key KP can be generated from a secret key belonging to the key distribution center in a similar manner as the KTTR keys are generated using secret key KT as shown in FIG. 3. This encryption key is then used to encrypt the program number and diskette serial number in encryption block 30 to produce the cryptographic key that is returned to the software vendor. As before, the security of the system can be enhanced by using encryption between the key distribution center and the software vendor to protect the secrecy of the communicated keys. Otherwise, the protocol is the same as that for the first embodiment. The password is written in the header record of the diskette as illustrated in Figure 7. The same options are available for automating the process at the software vendor. Likewise, an initialization program in the personal computer 10 can be used to automatically obtain the password from the software vendor, except here the smart card number must be entered instead of the computer number. The smart card number could be read from the smart card or from a location in the computer where it had been previously stored.

Figure 8:
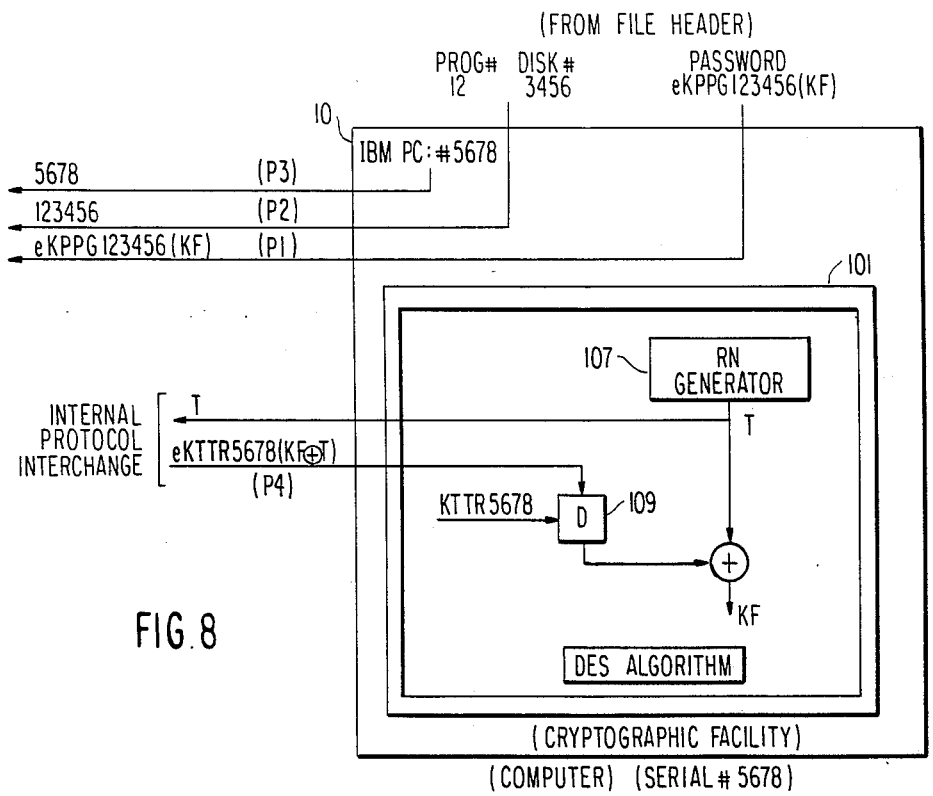
FIG. 8 is a flow diagram illustrating the operation of the computer cryptographic facility key management with a smart card using the DES algorithm.
Figure 9:
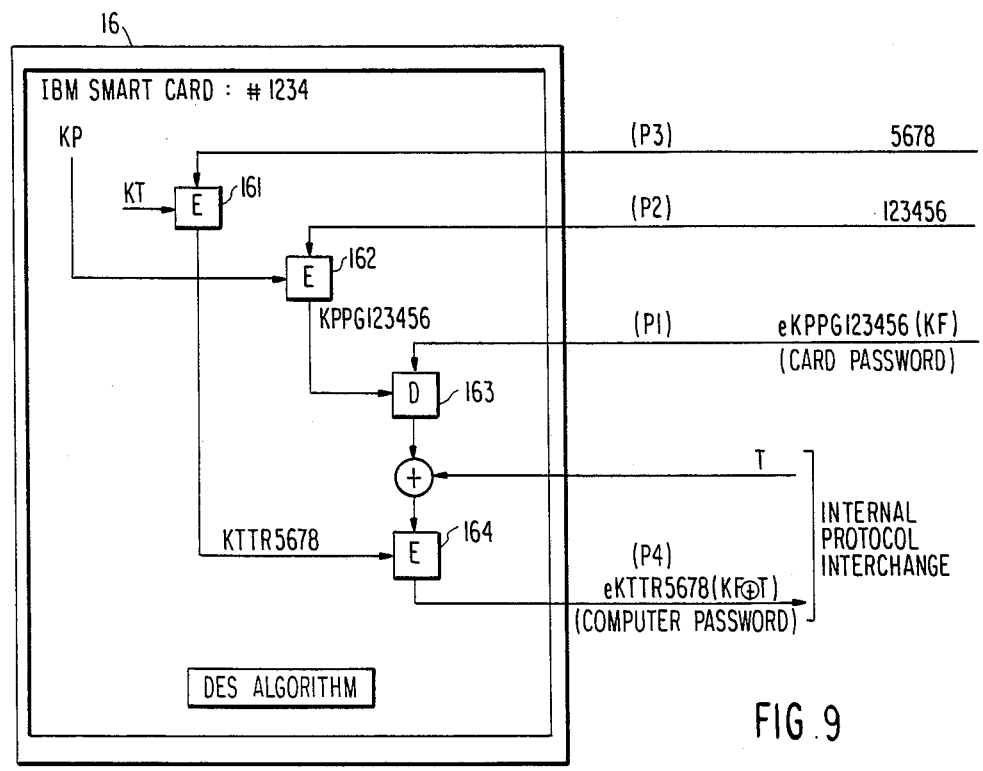
FIG. 9 is a flow diagram illustrating the operation of the smart card using the DES algorithm.

When the diskette is loaded at any authorized computer and the smart card 16 has been inserted into a proper reader device allowing the card and computer to carry on an electronic dialog, the encrypted program is automatically decrypted and written into the protected memory 101 from which it can only be executed. More specifically, as shown in FIGS. 8 and 9, the computer 10 reads the program number, diskette serial number and password from the file header and passes these with its computer number to the smart card 16. In the smart card 16, the computer number is encrypted in encryption block 161 with a universal key, KT, stored on every smart card. The program number and diskette serial number are encrypted in encryption block 162 with a key KP which is unique to and stored in the smart card. The output of encryption block 162 is a decryption key that is used by decryption block 163 to decrypt the password to produce the secret file key, KF.

Meanwhile, the cryptographic facility 101 of computer 10 produces a random number T using a random number generator 107 or the system clock. As part of the internal protocol interchange between the computer 10 and the smart card 16, the random number T is passed to the smart card where it is exclusive ORed with the file key, KF. The resulting output is encrypted in encryption block 164 with the output of encryption block 161 to produce a computer password that is then passed back to the computer. This computer password is then decrypted in decryption block 109 using a key unique to the computer. The output of decryption block 109 is exclusive ORed with the random number T to produce the secret file key, KF. Note that passwords generated by the card are time variant. If intercepted and replayed back into the computer at a later time, they will not allow another copy of the encrypted program on a different diskette to be decrypted and executed.

Figure 10:
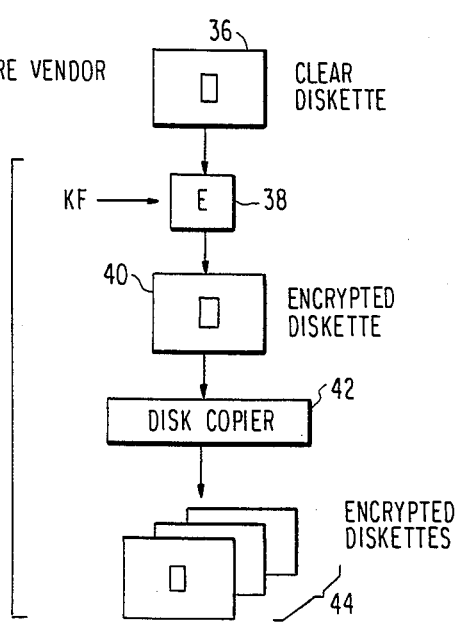
FIG. 10 is a flow diagram illustrating the generation of program diskettes by a software vendor.

FIG. 10 shows the process of generation of program diskettes. First, a clear diskette 36 containing the program is supplied by the software vendor to the software distributer. The software distributer then encrypts the program in encryption block 38 using a key KF to produce and encrypted diskette 40. The key KF could be common to a program or unique for each diskette. The encrypted diskette is then copied with a disk copier 42 to produce encrypted diskettes 44 for sale to users. Obviously, in the process illustrated, the software distributer and the software vendor could be one and the same.

Figure 11:
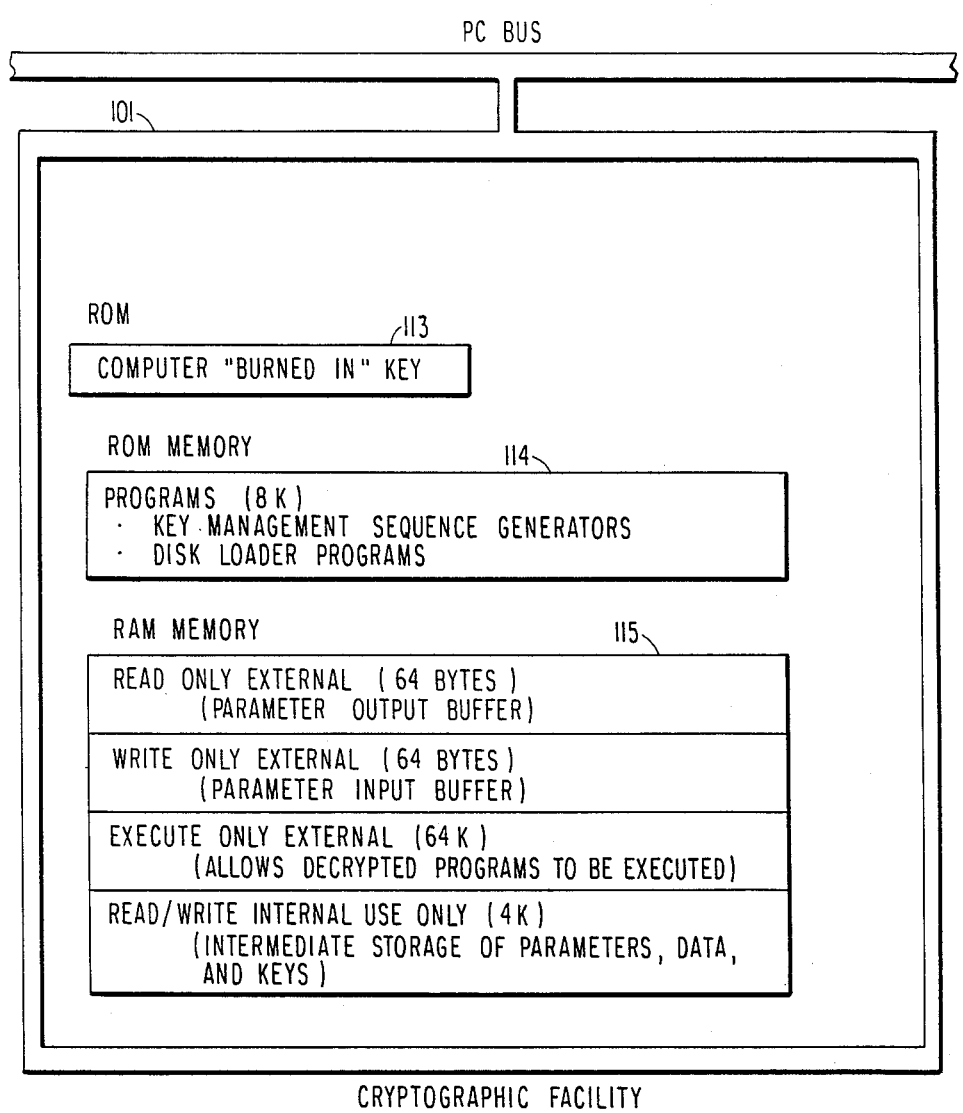
FIG. 11 is a block diagram of the components internal to a computer which comprises the cryptographic facility required in the practice of the present invention.

FIG. 11 shows the cryptographic facility 101 in the personal computer 10. The cryptographic facility is a secure implementation containing the Data Encryption Standard (DES) algorithm and storage for a small number of secret keys. It can be accessed logically only through inviolate interfaces secure against intrusion, circumvention and deception which allows processing requests via a control line, key and data parameters to be presented, and transformed output to be received. The cryptographic facility comprises a ROM, such as an EAPROM (Electronically Alterable and Programmable Read Only Memory), 113 that contains the computer key. Additional ROM 114 contains programs for key management sequence generators and disk loader. Additional Random Access Memory (RAM) 115 contains a parameter output buffer, a parameter input buffer, intermediate storage for parameters, data and keys, and additional storage for the decrypted programs. The RAM 115 is the protected memory of the cryptographic facility 101, and decrypted programs stored here can only be executed, not accessed for nonexecution purposes.

Figure 12:
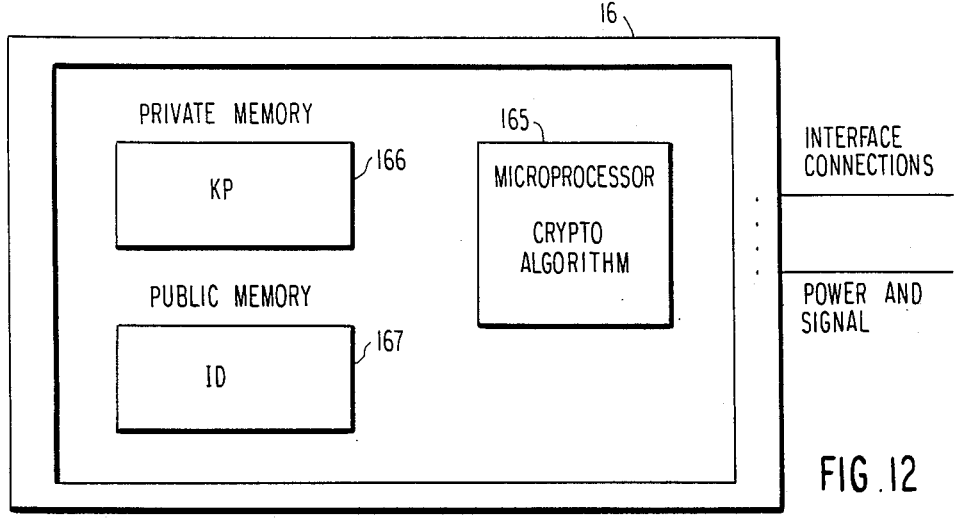
FIG. 12 is a block diagram showing the basic components of a smart card usable in the practice of the invention.

FIG. 12 shows the basic components of a smart card used in certain embodiments of the invention. The smart card must contain a microprocessor chip 165 for executing the crypto algorithm. Further, the card is provided with memory for storing the key KP and card number. The key KP, which is unique to the card and kept secret, is stored in private memory 166, while the card number is stored in public memory 167. Power for the microprocessor chip and supporting memories is derived from the computer 10.

The described protocol allows other software vendors to market encrypted programs that will operate with a personal computer or with a personal computer and smart card with no loss of security to protected software or the secret keys or parameters that support the system. To interface to the system, it is only necessary for the software vendor to forward an electronic message to the key distribution center, passing the program number and computer number or, in the case of an implementation supporting smart cards, passing the program number and smart card number. The key distribution center returns a cryptographic key unique to the program number and computer number or smart card number which the software vendor use in conjunction with the secret file key under which the program has been encrypted to generate the required password. To ensure that the same key is not produced by two different software vendors who have two different programs with identical program numbers, the protocol can be modified slightly by assigning a unique two or three digit code number to each software vendor and then merely redefining the program number to consist of the software vendor code number followed by the software vendor defined program number, i.e. by as many digits as are necessary to distinguish different programs offered by that software vendor. Thus, the program number and diskette serial number used in calculations is replaced by vendor number, program number and diskette serial number.

Figure 13:
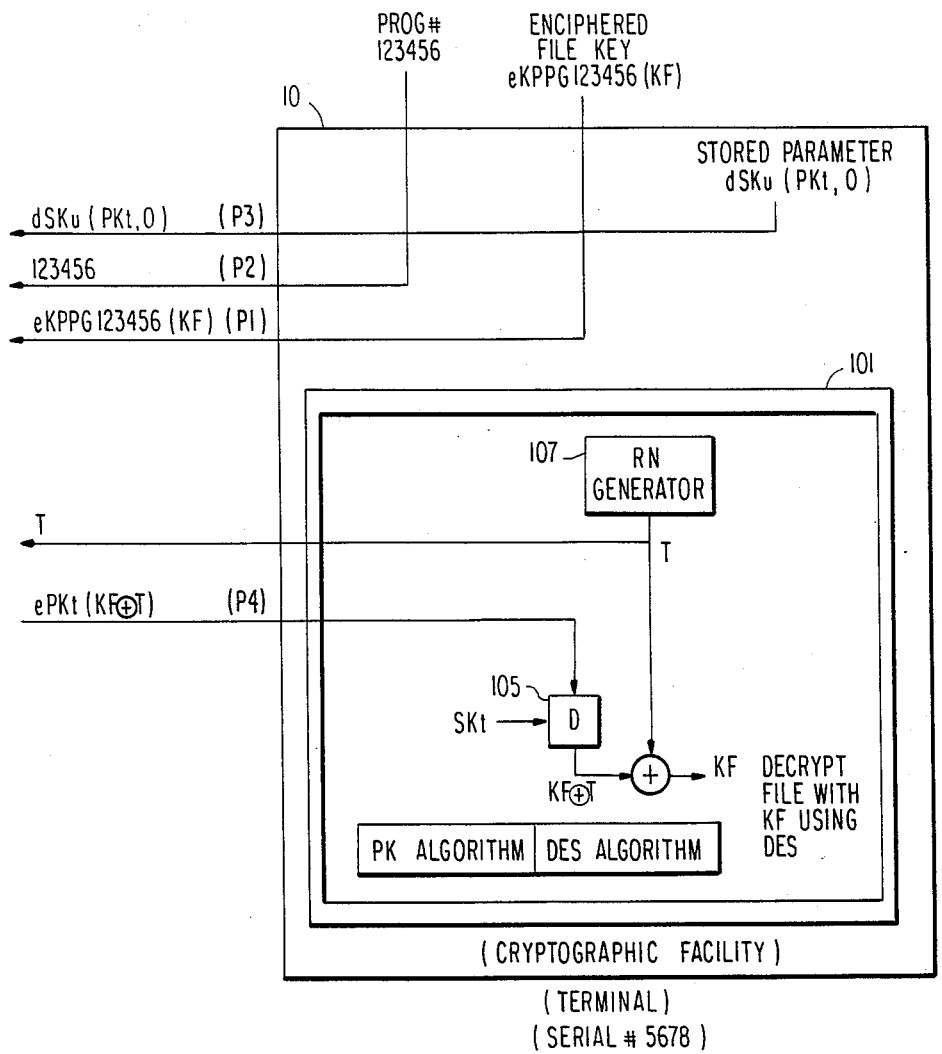
FIG. 13 is a flow diagram illustrating the operation of the computer cryptographic facility key management with the smart card using the DES/PK algorithm.
Figure 14:
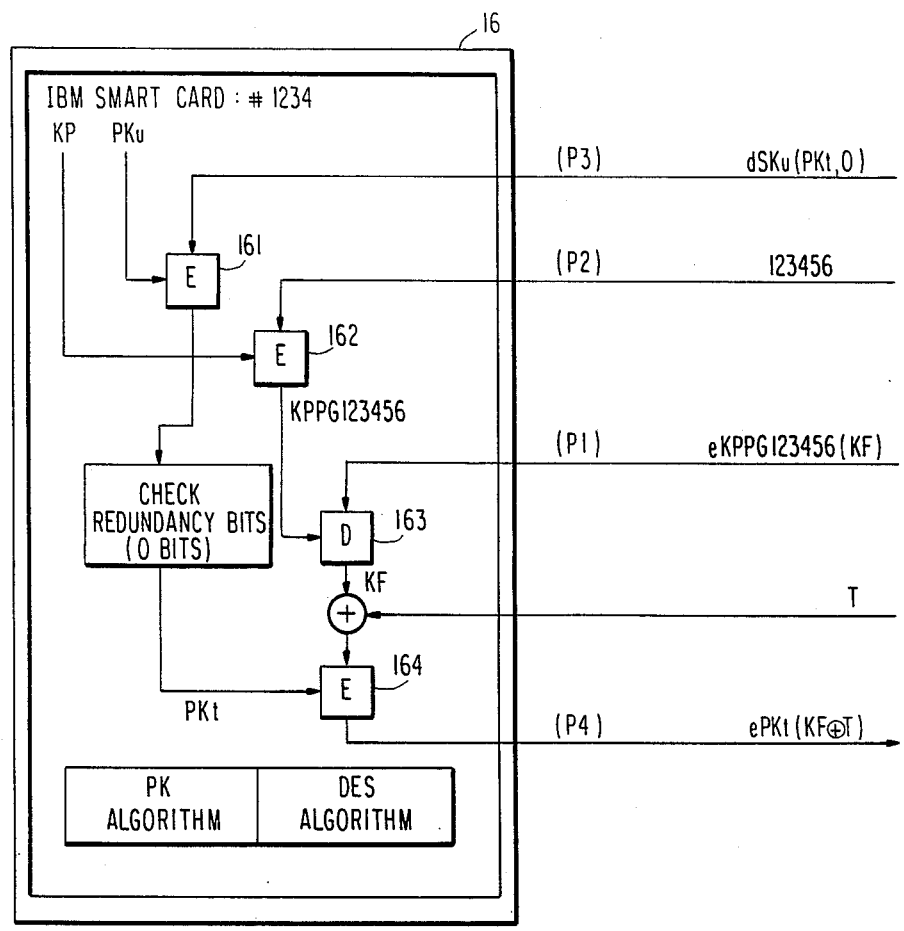
FIG. 14 is a flow diagram illustrating the operation of the smart card using the DES/PK algorithm.
Figure 20:
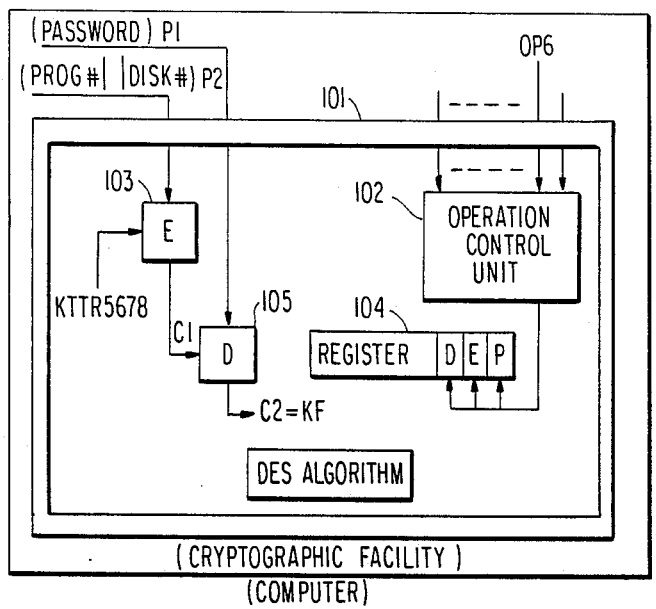
FIG. 20 is a flow diagram illustrating a sixth operation of the cryptographic facility for generating a file key from user input parameters for encrypting data.

Referring now to FIGS. 13 and 14, as already alluded to, the second embodiment of the invention using the smart card can be extended using a public key algorithm. More specifically, a public key (PK) algorithm is also installed in the smart card and computer in addition to the DES algorithm. The advantage of doing this is that the protocols for the three techniques are very similar. Introduction of the PK algorithm does not affect the password generation/distribution process described with reference to FIG. 6. In this embodiment, the main advantage of the PK algorithm is achieved, namely that a universal secret key need not be stored on the smart card. The card manufacturer personalizes the card with the key KP. The manufacturer also personalizes the card with PKu, the public key of the registry. When a customer buys software, s/he automatically gets a personalized smart card. Each different program recorded on a diskette is encrypted under a different file key, KF, designated by the supplier of the software. When a customer buys a program on a diskette, s/he mails a proof of purchase coupon to the vendor along with his or her name and the serial number from his or her smart card. In lieu of this, the proof of purchase coupon contains an authorization number that must be scratched clear as previously described. The numbers are sparse such that no one could easily guess a number that represents a valid authorization number. The customer calls an 800-number of the vendor and asks for a special password to activate his or her diskette. This number is given out only after the proof of purchase authorization number has been supplied and checked against an active online file to make sure that no one has already used the number. If all conditions are satisfied, the vendor asks for the customer's card number and uses this to access another active online file to obtain the key, KP, associated with the smart card as described with reference to FIG. 6. The vendor then enciphers the file key, KF, of the purchased program and gives this number to the customer as a password. The customer then goes to this computer and causes the password to be written in the header of the file on the diskette as previously described. As shown in FIG. 20, the header of the diskette has stored therein the password eKPPG123456(KF), where KF is the secret file key of the program. Thus, to this point the procedure is similar to that described with respect to the smart card/DES only algorithm.

The computer manufacturer personalizes the computer with a unique key pair, the computer public key, PKt, and the computer secret key, SKt. The computer manufacturer has the public key of the computer recorded in a public registry. In effect, this means that PKt is stored in the form dSKu(PKt), where SKu is the secret key of the registry and PKt is the public key of the computer. This value dSKu(PKt) is also stored in the computer.

To use a diskette at any computer, there is a handshake protocol used between the smart card 16 and the computer 10 which, in effect, recovers the file key, KF, from encipherment under the key KP and enciphers it under the public key, PKt, of the computer. More specifically, the public key, PKt, of the computer 10 in the form dSKu(PKt) is encrypted in encryption block 161 with the public key of the registry, PKu, to produce the public key, PKt, of the computer. The notation dSKu(PKt,0) means that the public key PKt with several redundancy bits (0 bits in this case) concatenated with it is decrypted under the secret key SKu. Sku is the secret key belonging to the computer manufacturer. The redundancy bits are added to the message so that upon decryption, one can ensure that no spurious text is decrypted and used as the key PKt. Ordinarily, 16 to 64 bits of redundancy is enough. As a result of these redundancy bits, the output of encryption block 161 must be checked to ensure that the redundancy bits compare with a prestored constant value. If they do, then one can be certain that the recovered PKt is the public key of some computer manufactured by the computer manufacturer. This ensures that an opponent can not get a smart card to use a public key PKt except one issued by the computer manufacturer. Of course, it will be recognized by those skilled in the art that the block with the redundancy bits will typically be longer than the public key PKu which will necessitate splitting the block and performing the encryption process under PKu using chaining techniques well known in the art.

The program number read from the diskette is also encrypted with the key KP in encryption block 162 to generate the key KPPG123456 which is used to decrypt the encrypted key KF in decryption block 163. The output of decryption block 163 is exclusive ORed with a random number T produced by random number generator 107, and the result is encrypted in encryption block 164 with the key PKt to produce the secret file key, KF, exclusive ORed with the random number T encrypted under the public key of the computer, PKt. This password is passed by the smart card 16 to the cryptographic facility 101 of the computer 10 where it is decrypted in decryption block 105 using the secret key, SKt, of the computer and then exclusive ORed with the random number T. The file key, KF, is now in a form that can be used at the computer. The protocol is such that the handshake will work only at a suitable computer with a public key that has been properly recorded in the registry, i.e. for which PKt has been deciphered under the secret key of the registry.

The advantages of the mixed public key and DES embodiment are several. No secret universal key needs to be stored on the card since all universal keys used in the system are public keys. Even if the file key, KF, is discovered, there is no way for an adversary to cause a clear key to be accepted by the card. The value T sent from the computer prevents an adversary from tapping the interface to obtain the encrypted key KF and replaying it into a computer. If it were easy to input parameters across the interface from a dummy card, such an attack is thwarted by incorporating the value T.

The described protocol allows software vendors to market encrypted programs that will operate with a particular computer and smart card with no loss in security to the protected software of a given vendor or the secret keys or parameters that support the system. To interface to the system, it is only necessary for the software vendor to forward an electronic message to the key distribution center, passing the program number and computer number or, in the case of an implementation supporting smart cards, passing the program number and smart card number. The key distribution center returns a cryptographic key unique to the program number and computer number or smart card number. The software vendor uses this cryptographic key in conjunction with the secret file key under which the program has been encrypted to generate the required password.

Figure 15:
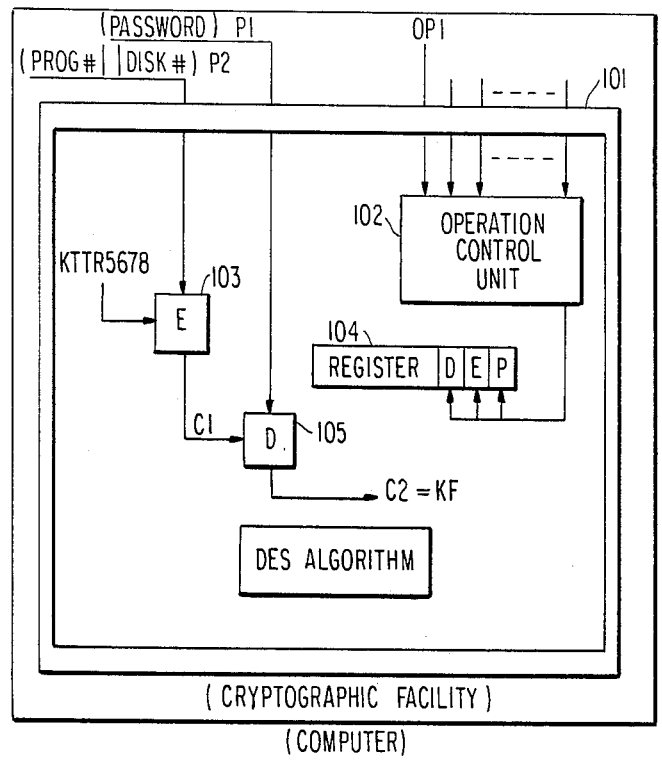
FIG. 15 is a flow diagram illustrating a first operation of the cryptographic facility which derives a file key from user input parameters.

The cryptographic facility 101 supports a limited set of cyrptographic operations for key management purposes. These operations are controlled by seven microcode routines stored in ROM and initiated by decoding of an operation code corresponding to a specific operation. The first of the seven operations is illustrated in FIG. 15 of the drawings. With no smart card, the first operation is decoded in operation control unit 102, and the address for the microcode is stored in register 104. The first operation accepts a password P1 and a number P2 representing the concatenation of the program number and diskette serial number read from a file header record, and from these input parameters, it derives a file key, KF, that is used only by the cryptographic facility to decrypt an encrypted program for the purpose of only executing the program. More specifically, the program number and diskette serial number, concatenated together, are encrypted under a "burned in" key KTTR5678 in encryption block 103 to produce a ciphertext output C1. Then, the password is decrypted in block 105 using as a key the ciphertext C1 produced by block 103 to produce ciphertext C2 representing the file key, KF. The user has no access to the file key; i.e., it is kept secret.

Figure 16:
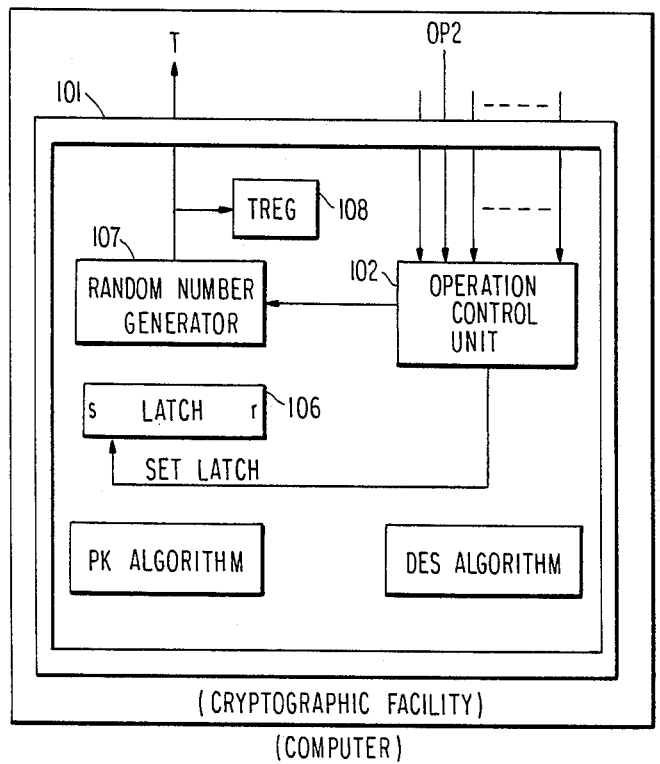
FIG. 16 is a flow diagram illustrating a second operation of the cryptographic facility which causes a random number to be generated.

With a smart card, the second operation shown in FIG. 16 causes a random number T to be generated inside the cryptographic facility. A special latch 106 in the cryptographic facility is also set on as a result of this operation. The value of T is generated by the random number generator 107 and stored in a T register 108 in the cryptographic facility and also presented as an output so that it can be sent to the smart card. In carrying out the computer/smart card protocol, the T output is sent to the smart card together with the parameters P1 (password) and P2 (program number|diskette serial number, where | denotes contatenation) and a third parameter P3. Where the crypto facility uses the DES algorithm, as shown in FIGS. 8 and 9, to encrypt the file key, P3 is the computer number. Alternatively, where the crypto facility uses the PK algorithm to encrypt the file key, as shown in FIGS. 13 and 14, P3 represents the concatenation of the public key of the computer, PKt, and a nonsecret constant of sufficient bits which may have a value of zero all decrypted under the secret key, SKu, of the distribution center.

Figure 17:
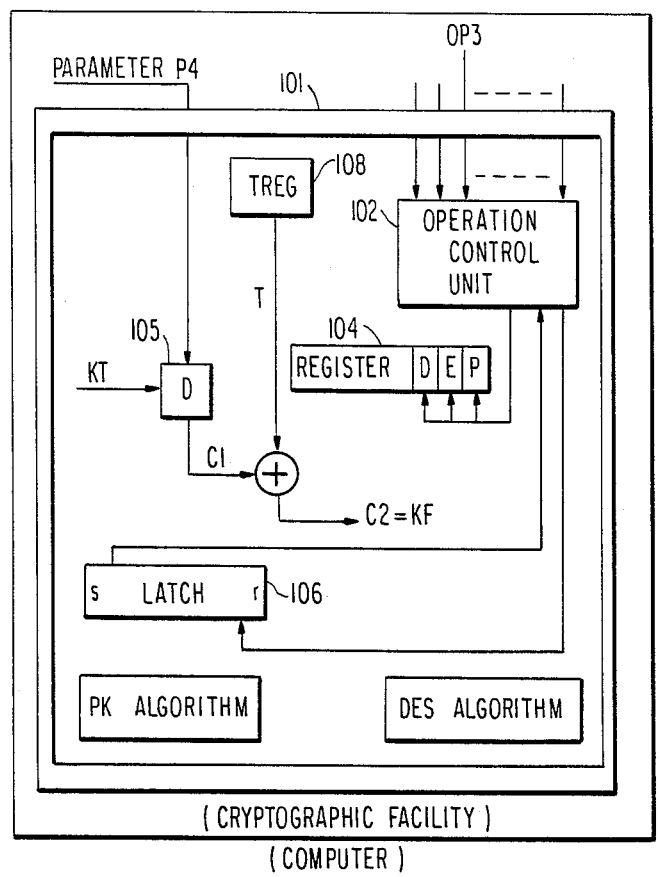
FIG. 17 is a flow diagram illustrating a third operation of the cryptographic facility which uses a password from a smart card and a random number to derive a file key to decrypt a program.

Also with the smart card, a third operation shown in FIG. 17 accepts a password P4 from the smart card provided that the latch 106 is set on. Otherwise, the request is ignored. From the password P4 and the stored random number T in register 108, it derives a file key, KF, that is used by the cryptographic facility to decrypt an encrypted program for the purpose of only executing that program. The decryption algorithm for deriving the file key, KF, may be DES or may be PK. The user has no access to the file key. After the latch 106 has been tested, latch 106 is reset by operation control unit 102. This ensures that a new random number T must be generated before another password will be accepted by the cryptographic facility via another invocation of the third operation and thus prevents old passwords from being played back into the crypotographic facitlity. Used together, the second and third operations are such that they allow an encrypted program to be decrypted and executed at any computer with a similarly installed cryptographic facility supporting those operations. The microcode for the third operation procedes as follows: First, latch 106 is tested to see if it is set. If not, the operation is aborted; otherwise, the latch is reset. The parameter P4 is then decrypted with the "burned in" key KT in decryption block 105 to produce the ciphertext output C1. This decryption step is performed with the DES algorithm using KT=KTTR5678 where only DES is available as shown in FIG. 8 or, with the PK algorithm, the decryption step is performed using KT=SKt where both DES and PK are available as shown in FIG. 13. In either case, the resulting ciphertext C1 is exclusive ORed with the random number T stored in register 108 to produce the ciphertext C2 representing the file key, KF.

The register 104 in addition to storing the address for the decoded microcode, has three flags denoted D, E and P. Up to this point in the description, the operation of the cryptographic facility has been to derive the file key that can be used to decrypt an encrypted program. As will be understood from the following description, it is also possible for a user to use the file key to encrypt data. The flags D, E and P are used to control these operations. The D flag is the decryption flag, and the E flag is the encryption flag. The cryptographic operations of encipher and decipher data are assumed to be such that a cipher operation will be performed only if the E flag is tested and found to be set for an encipher data operation or if the D flag is tested and found to be set for a decipher operation. In addition, before decrypted data is directed from the cryptographic facility, the cryptographic facility will test the P flag. If the P flag is set, the decrypted data will be directed to an execute only memory in the cryptographic facility; otherwise, the decrypted data will be directed to the main memory. Thus, in the case of the first and third operations described above, the microcodes for those operations would in addition set the D flag, reset the E flag, and set the P flag.

Figure 18:
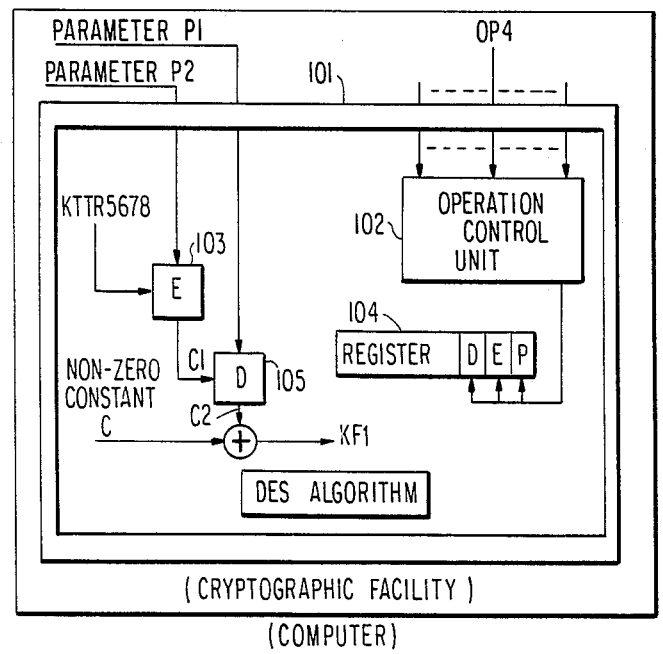
FIG. 18 is a flow diagram illustrating a fourth operation, similar to the first, of the cryptographic facility for generating a file key using a different algorithmic procedure than used in the first operation.

In addition to the first three operations, the cryptographic facility also supports a limited set of general purpose cryptographic operations. The first of these, referred to as the fourth operation, is similar to the first operation and is illustrated in FIG. 18. With no smart card, the fourth operation accepts user selected parameters P1 and P2, which may be any different arbitrary values selected by the user. From these parameters, the fourth operation generates a file key, KF1, using a different algorithmic procedure than that used by the first operation, where KF1 is a variant of the file key KF. In the fourth operation, the "burned in" key KTTR5678 is used to encrypt parameter P2 in encryption block 103. The output of the encryption block 103 is the ciphertext C1 which is used in decryption block 105 to produce the ciphertext C2 representing KF. KF is then exclusive ORed with the non-zero constant, C, to produce the variant file key KF1. The key KF1 is used only by the cryptographic facility to encrypt and decrypt data. The encrypted and decrypted data are under the control of and accessible to the computer user. In this case, the user has a limited encrypt and decrypt feature, except that the process is performed under the control of a key unknown to the user of the computer. Thus, in this operation the microcode sets both the D and E flags and resets the P flag in register 104. By remembering the parameters P1 and P2, the computer user can decrypt encrypted data at any later time only on his or her own computer. The user cannot migrate the encrypted data to another computer and decrypt it with the same parameters P1 and P2.

Figure 19:
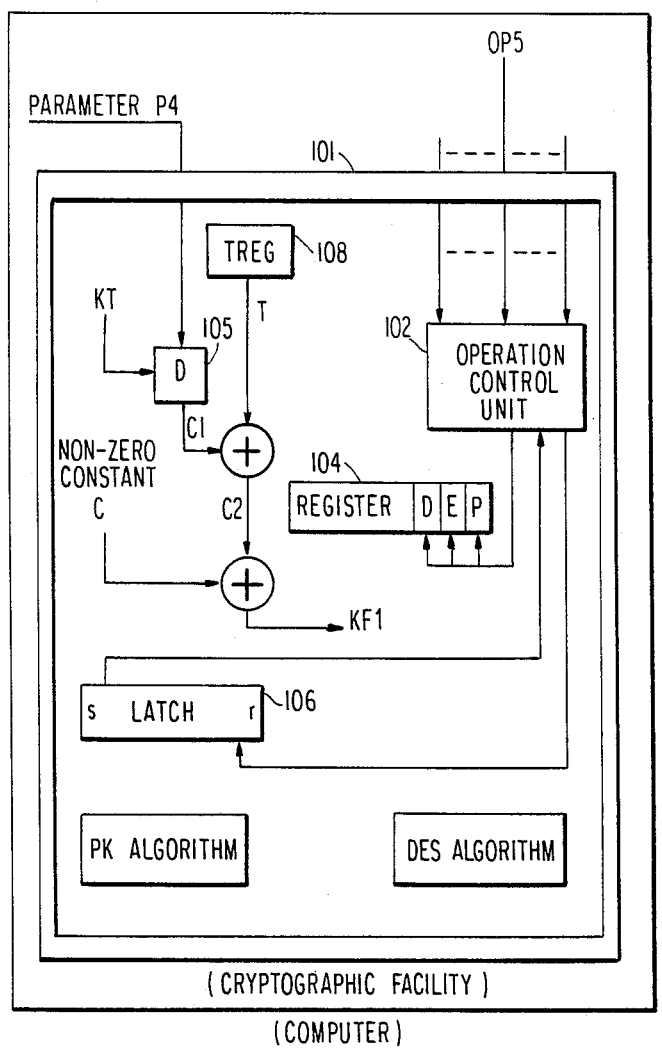
FIG. 19 is a flow diagram illustrating a fifth operation, similar to the second, of the cryptographic facility for generating a file key using the same algorithmic procedure as used in the fourth operation.

With a smart card, a fifth operation shown in FIG. 19 accepts a password P4 from the smart card provided that the latch 106 is set on. Otherwise, the request is ignored. From this parameter P4, the fifth operation generates the file key, KF1, using a different algorithmic procedure than used by the third operation. The password P4 used in the fifth operation is produced by the smart card, using the DES algorithm procedure shown in FIG. 9 or the PK algorithm procedure shown in FIG. 14, from parameters P1, P2 and P3 as well as the random number T generated by the second operation, where P1 and P2 are user defined parameters and P3 is the computer number when the crypto facility uses the DES to encrypt KF or P3 is the cryptographic variable eSKu(PKt,0) when the crypts facility uses the PK to encrypt KF. Thus, again the user has a limited encrypt and decrypt feature, except that the process is performed under the control of a key unknown to the user of the computer. By remembering the parameters P1 and P2, the computer user can decrypt encrypted data at any later time on his or her computer, or any other computer with a similarly installed cryptographic facility supporting the second and fifth operations, by issuing the second operation to generate a new random number T. The computer/smart card protocol passes T, P1, P2, and P3 to the smart card to generate P4 as shown in FIG. 9 or FIG. 14. Then a fifth operation is called for to cause the cryptographic facility to recover the key KF1 from P4, C and the stored random number T. Thus, the user can migrate the encrypted data to another computer and decrypt it with the same parameters P1 and P2. Again, the encrypted and decrypted data are under the control of and accessible to the computer user. The microcode for the fifth operation procedes as follows: First, latch 106 is tested to see if it is set on. If it is not, the operation is aborted; otherwise, the latch is reset and the input parameter P4 is decrypted in decryption block 105 with the "burned in" key KT. Where only DES is available, KT=KTTR5678, but where both DES and PK are available, KT=SKt. The output of the decryption block 105 is the ciphertext C1 which is exclusive ORed with the random number T stored in register 108 to produce the cipher text C2 representing KF. KF is then exclusive ORed with the non-zero constant C to produce the variant file key KF1. The microcode then sets the D and E flags and resets the P flag in the register 104.

With no smart card, a sixth operation shown in FIG. 20 accepts a user selected password P1 and a number P2, which may be any arbitrary values selected by the user, and from these numbers, it generates a file key, KF, using the same algorithmic procedure as used by the first operation. The file key is used only by the cryptographic facility to encrypt data. In this case, the user can encrypt his or her own data but not decrypt it. Used in conjunction with the first operation, the sixth operation allows a user to encrypt his or her own programs and store them on diskette or hard disk in protected form. The parameters P1 and P2 can also be written in the header record of the diskette file or disk file. Later, the saved values of P1 and P2 are used as input parameters with the first operation to decrypt and execute programs. P1 and P2 are such that they permit the encrypted program to be decrypted and executed only at the computer where the program was originally encrypted, so that encrypted programs cannot be migrated to other computers and executed. The microcode for the sixth operation procedes as follows: First, the parameter P2 is encrypted in encryption block 103 with the "burned in" key KTTR5678 to produce the ciphertext C1. The ciphertext C1 is used in decryption block 105 to decrypt the parameter P1 and produce the ciphertext C2 representing the file key, KF. The microcode sets the E flag and resets the D and P flags in register 104.

Figure 21:
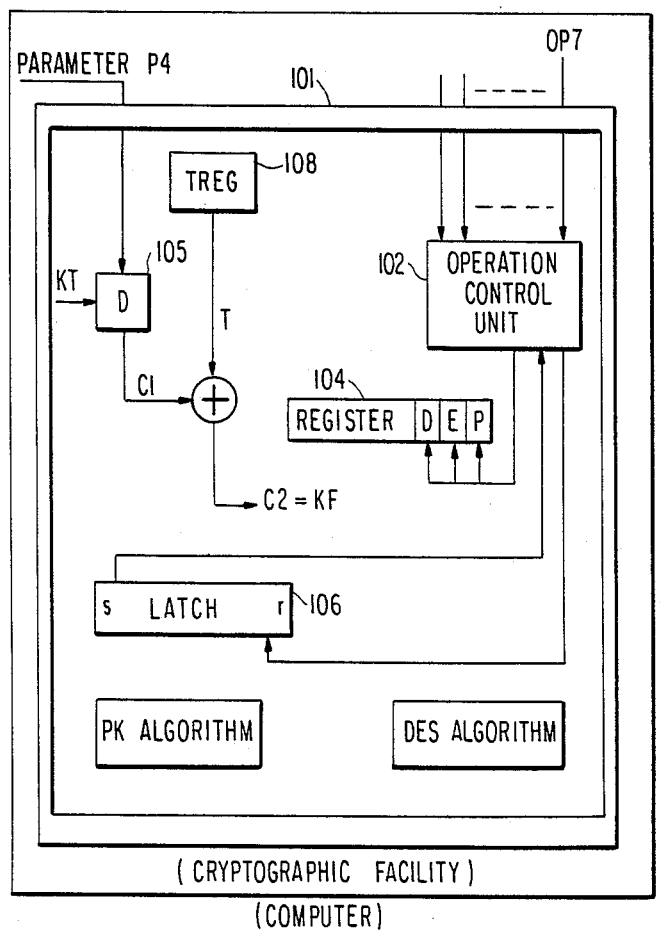
FIG. 21 is a flow diagram illustrating a seventh operation of the cryptographic facility which accepts a password from a smart card for generating a file key for encrypting data.

With a smart card, a seventh operation shown in FIG. 21 accepts a password P4 from the smart card provided that the latch 106 is set on. Otherwise, the request is ignored. From this it generates a file key, KF, using the same algorithmic procedure used by the third operation. More specifically, the microcode decrypts the input parameter P4 in decryption block 105 with the "burned in" key KT to produce the ciphertext C1. With the DES algorithm alone, KT=KTTR5678 is used, or with a PK algorithm, KT=SKt. The ciphertext is then exclusive ORed with the random number T stored in register 108 to produce the ciphertext C2 representing the file key, KF. The microcode for the seventh operation also sets the E flag and resets the D and P flags in the register 104. In the seventh operation, the key KF is used only by the cryptographic facility to encrypt data. The user can encrypt his or her own data but cannot decrypt it. The password P4 used in the seventh operation is produced by the smart card, using the DES algorithm procedure shown in FIG. 9 or the PK algorithm procedure shown in FIG. 14, from the parameters P1, P2 and P3 as well as the random number T generated by the second operation. P1 and P2 are user defined parameters. Where the crypto facility uses the DES algorithm, as shown in FIGS. 8 and 9, to encrypt the file key, P3 is the computer number. Alternatively, where the crypto facility uses the PK algorithm to encrypt the file key, as shown in FIGS. 13 and 14, P3 represents the concatenation of the public key of the computer, PKt, and a nonsecret constant of sufficient bits which may have a value of zero all decrypted under the secret key, SKu, of the distribution center. Used in conjunction with the second operation, the seventh operation allows the user to encrypt his or her own programs and store them on a diskette or hard disk in protected form. The parameters P1 and P2 can also be written in the header record of the diskette or disk file. Later, the computer user can decrypt and execute the program on his or her computer, or any other computer with a similarly installed cryptographic facility supporting the second and third operations, by issuing the second operation to produce a new random number T, passing parameters P1, P2, P3, and T to the smart card and requesting a new value of P4, and issuing the third operation to recover the file key KF in the cryptographic facility from the parameter P4 and the stored random number T. Thus, the parameters P1 and P2 are such that they permit an encrypted program to be decrypted and executed at other computers supporting the second and third operations. Because the seventh operation does not allow decryption under the recovered key KF, it cannot be misused by a user to decrypt an encrypted program purchased in the usual manner.

Summarizing, the procedures that are available to a user of a computer with a cryptographic facility that supports the seven operations just described are listed in the table below:

|  | Operation(s) |
|---|---|
| DES Only, No Smart Card | |
| 1. Program Decryption-Execution | OP1 |
| 2. File Encryption/Decryption | OP4 |
| 3. Program Encryption | OP6 |
| DES Only, With Smart Card | |
| 1. Program Decryption-Execution | OP2,OP3 |
| 2. File Encryption/Decryption | OP2,OP5 |
| 3. Program Encryption | OP2,OP7 |
| DES/PK, With Smart Card | |
| 1. Program Decryption-Execution | OP2,OP3 |
| 2. File Encryption/Decryption | OP2,OP5 |
| 3. Program Encryption | OP2,OP7 |

While the invention has been particularly shown and described with reference to several preferred embodiments thereof, it will be understood by those skilled in the art that several changes in form and detail may be made without departing from the spirit and scope of the invention.

We claim:

1. A method of software protection comprising the steps of:
   encrypting at least a predetermined portion of each program offering sold by any one of a plurality of software vendors with a unique file key;
   distributing the encrypted program as a program file;
   providing a computer with a unique cryptographic key identifier, a processor, a protected memory and a cryptographic facility containing a cryptographic key associated with said unique cryptographic key identifier;

providing a purchaser of the encrypted program with an authorization number unique to the particular program and said cryptographic identifier;

decrypting that portion of said program encrypted by said encrypting step with said cryptographic facility as a function of said authorization number;

storing at least said predetermined portion of said decrypted program in said protected memory; and reading said stored portion of said decrypted program from said protected memory only to said processor for execution;

wherein the step of providing the secret password is performed by the steps of:

providing the purchaser of the storage medium containing the encrypted program with an authorization number and identifying the encrypted program with a program number and the storage medium with a storage medium number;

requesting the purchaser to input the authorization number, the program number, the storage medium number and a number identifying said cryptographic key identifier;

computing from the inputed program number and storage medium number an authorization number;

comparing the computed authorization number with the inputted authorization number;

providing a key distribution center with the inputted program number, storage medium number and the number identifying said cryptographic key identifier if the computed and inputted authorization numbers are the same, otherwise rejecting a password request by the purchaser;

generating a first key as a function of said cryptographic key identifier and then encrypting the program number and storage medium number concatenated together with said first key to produce a second key at the key distribution center; and encrypting the secret file key of the program with said second key to produce said password.

2. The method of software protection as recited in claim 1 further comprising the step of determining if the computer authorization number has been used before, and if it has not, then performing the step of comparing the computed authorization number with the inputted authorization number, otherwise rejecting a password request by the purchaser.

3. The method of software protection as recited in claim 1 wherein the step of decrypting at least a portion of the program is performed by the steps of:

reading said password, program number and storage medium number from said header record, encrypting said program number and storage medium number concatenated together with a key which is a function of said secret unique cryptographic key identifier to produce a decryption key, decrypting said password with said decryption key to produce said secret file key, and decrypting the program using said secret file key.

4. A method of software protection comprising the steps of:

encrypting at least a predetermined portion of each program offering sold by any one of a plurality of software vendors with a unique file key;

distributing the encrypted program as a program file;

providing a computer with a unique cryptographic key identifier, a processor, a protected memory and a cryptographic facility containing a cryptographic key associated with said unique cryptographic key identifier;

providing a purchaser of the encrypted program with an authorization number unique to the particular program and said cryptographic identifier;

decrypting the portion of said program encrypted by said encrypting step with said cryptographic facility as a function of said authorization number;

storing at least said predetermined portion of said decrypted program in said protected memory; and reading said stored portion of said decrypted program from said protected memory only to said processor for execution;

wherein the step of providing a computer with a unique cryptographic key identifier is performed by issuing to the purchaser a smart card having said unique cryptographic key identifier, said smart card interfacing with said computer;

wherein the step of providing the secret password is performed by the steps of:

providing the purchaser of the storage medium containing the encrypted program with an authorization number and identifying the encrypted program with a program number and the storage medium with a storage medium number;

requesting the purchaser to input the authorization number, a number of the smart card, the program number and the storage medium number;

computing an authorization number from the inputted program number and storage medium number;

comparing the computed authorization number with the inputted authorization number, and if the computed and inputted authorization numbers are the same, providing a key distribution center with the inputted number of the smart card, the program number and the storage medium number, otherwise rejecting a password request by the purchaser;

generating a card key corresponding to the inputted card number and then encrypting the program number and storage medium number concatenated together with said card key to produce an encryption key at the key distribution center;

generating a secret file key corresponding to the inputted program number, and encrypting said secret file key with said encryption key to produce said password.

5. The method of software protection as recited in claim 4 further comprising the step of determining if the computed authorization number has been used before, and if it has not, then performing the step of comparing the computed and inputed authorization numbers, otherwise rejecting a request for a password by the purchaser.

6. The method of software protection as recited in claim 12 wherein the step of decrypting at least a portion of the program is performed by the steps of;

supplying the smart card with the password, program number and storage medium number, encrypting in the smart card the program number and storage medium number concatenated together with the key of the smart card to produce a decryption key, decrypting the password with said decryption key to produce the secret file key, and decrypting in the computer at least said portion of the program using the secret file key.

7. The method of software protection as recited in claim 6 further comprising the steps of:
supplying the smart card with a number identifying said cryptographic facility,
encrypting in the smart card the number identifying said cryptographic facility with a universal key to produce a computer encryption key,
generating in the computer a random number and supplying the random number to the smart card,
exclusive ORing in the smart card the secret file key with the random number and encrypting the result with said computer encryption key to produce an encrypted exclusive ORed output,
decrypting in the computer the encrypted exclusive ORed output with the computer encryption key, and
exclusive ORing the decrypted exclusive ORed output with said random number to produce the secret file key.

8. The method of software protection as recited in claim 7 wherein the steps of encryption in the smart card and decryption in the computer are performed using the DES algorithm.

9. The method of software protection as recited in claim 6 further comprising the steps of:
providing the computer with a public key, PKt, decrypted under the secret key of a public registry, and also providing said cryptographic facility with a corresponding secret key, SKt,
providing said smart card with a public key, PKu,
encrypting in the smart card the computer public key decrypted under the secret key of the public registry with the card's public key PKu to produce said key PKt,
generating in the computer a random number and supplying the random number to the smart card,
exclusive ORing in the smart card the secret file key with the random number and encrypting the result with said key PKt to produce an encrypted exclusive ORed output,
decrypting in the computer the encrypted exclusive ORed output with the key SKt, and
exclusive ORing the decrypted exclusive ORed output with said random number to produce the secret file key.

10. The method of software protection as recited in claim 9 wherein the steps of encryption and decryption in the smart card and the computer are performed by selectively using the DES algorithm and a public key algorithm.

* * * * *